UNITED STATES PATENT OFFICE 2,361,322

PLASTICIZED THERMOSETTING RESINS

Paul C. Schroy, Darien, Conn., assignor to American Cyanamid Company, New York, N. Y., a corporation of Maine No Drawing. Application April 5, 1939, Serial No. 266,135

4 Claims. (Cl. 260—33)

This invention relates to improving the plasticity of a thermosetting resin and compositions containing such resins. It is particularly directed to improving the plasticity of urea formaldehyde resins, phenol formaldehyde resins, melamine formaldehyde resins, etc.

Various compounds have previously been suggested for use as plasticizers for thermosetting resins. Most of these plasticizers which have been used are only compatible with thermosetting resins, such as urea formaldehyde resins, in limited proportions. For this reason, among others, the results have been somewhat unsatisfactory.

It is an object of this invention to improve the plasticity of thermosetting resins by means of substances which have good compatibility with the resin and which also improve the flow characteristics of the resin to a great extent.

This and other objects are accomplished by adding a small quantity of a substance containing the group

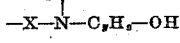

where X is $SO_2$ or CO and $y$ and $z$ are integers. Among the substances which contain this grouping are N-alkylol carboxylic acid amides, N-alkylol sulfonamides, N-alkylol imides.

A general formula for this group of compounds is the following:

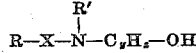

where R represents an organic radical, e. g. alkyl, aryl, or aralkyl and R' represents hydrogen, alkyl, aryl, or an acyl group, and the other symbols are the same as stated above. The compounds of this general type may be produced in any suitable manner such as by the reaction of a sulfonyl or carbonyl chloride with an alkylol amine, by the reaction of a carboxylic acid amide with an aldehyde, by the reaction of an imide with an aldehyde, etc.

The following examples show the use of these plasticizers in molding compositions, the proportions being given in parts by weight.

Example 1

A molding composition containing 30 to 40% sulfite pulp and from 70 to 60% of a urea formaldehyde resin together with an accelerator and a mold lubricant is blended with from 1 to 10% of p-toluene ethanol sulfonamide. This composition can be molded satisfactorily at pressures from 60 to 80% of those necessary when the plasticizer is not present. Furthermore, no "wet" moldings are obtained.

Example 2

Laminating paper is impregnated with a urea-thiourea-formaldehyde resin syrup containing about ½% to about 15% of N-methylol-p toluene sulfonamide. The paper is dried to a volatile content of from about 3% to about 8% measured at about 150° C., and is stacked and pressed between plates at about 130° C., and at about 1500 lbs. per sq. in. pressure. The resulting laminating sheet is quite uniform and has excellent resistance to water, acid and alkali. In making laminating sheets, it has been found that pressures of only about 50% of those necessary without the presence of the plasticizer give equally good or superior results.

Example 3

From about 1% to about 15%, preferably about 10%, of N-methylol benzamide is added to a formaldehyde-urea or a formaldehyde-thiourea syrup. The laminated sheets prepared with these syrups are easily pressed to form homogeneous products which show no "sweating out."

Example 4

From about 1% to about 7%, preferably about 5%, of N-methylol phthalimide is added to a urea resin-cellulose molding composition, e. g. a composition similar to that disclosed in Example 1. Excellent moldings were obtained from these compositions at pressures substantially less than those necessary without the added plasticizer. Furthermore no "sweating out" is observed.

Examples of other compounds which have been found suitable for use as plasticizers in the same general way as is illustrated in the examples above, include N-ethanol benzamide and the N-ethanol and N-methylol derivatives of toluamide, stearamide, succinimide and xylene sulfonamide. Di-substituted compounds such as N, $N^1$-diethanol toluene disulfonamide may also be used.

While it is preferred that these plasticizers be used in concentrations ranging from about ½% to about 15%, some of the more compatible members of the group may be used in concentrations up to 30% or even more without undesirable results such as "sweating out." The concentrations selected for any particular member of the group of plasticizers disclosed, will be dependent not only on the compatibility for that particular substance with the particular resin to be used, but also on the type of molding which is to be made from the resin composition. In general it has been found that about 5 to 10% of the plasticizer will give good results.

These new plasticizers have been found suitable for use with various thermosetting resins such as urea-formaldehyde resins, phenol-formaldehyde resins, melamine-formaldehyde resins, etc. Obviously various mixtures of these resins could be used. Furthermore, mixtures of urea, thiourea, or melamine could be used to form a composite resin with formaldehyde. Such composite resins may be modified with our new plasticizers in the same way as the simple resins.

The following examples show representative methods of producing some of these new plasticizers, the proportions being given in parts by weight.

*Example 5*

One mol of toluene sulfonamide is reacted with one mol of formaldehyde (37% solution) which has previously been neutralized to a pH of between about 6.8 and 7.2 with triethanolamine. The reaction mixture is kept at a temperature of between about 20° C. and about 30° C. for about 12 hours, after which time the desired reaction is substantially complete. To avoid the formation of relatively incompatible resinous materials, the reaction temperature should be controlled, and the pH should be kept nearly neutral, since excessive heat and strong acid or alkaline solution tend to catalyze resin formation. The product, N-methylol toluene sulfonamide, is a clear oily liquid compatible with urea resin syrups as indicated in Example 2. The reaction may be carried out in a suitable solution, e. g. in an alcoholic solution.

*Example 6*

To 261 parts (one mol) of monoethanolamine and 40 parts (one mol) of sodium hydroxide in a 25% aqueous solution, 144 parts (0.5 mol) of toluene-disulfonyl chloride are added slowly and with vigorous shaking. At the end of the reaction, the solution is diluted with water to a concentration of about 10% with respect to the sodium hydroxide and the layer of liquid product is separated from the aqueous layer. To eliminate primary amine salts, the product is mixed with a dilute solution of formaldehyde and then neutralized to a pH of about 7 with sodium hydroxide. The sodium chloride which is formed is washed out with water and the product separated. The N,N¹-diethanol toluene disulfonamide is a clear oily liquid which is readily compatible with urea resin syrup.

*Example 7*

The same procedure as used in Example 6 is carried out with 102 parts (0.5 mol) of xylenesulfonyl chloride, 30.5 parts (0.5 mol) of monoethanolamine and 0.5 mol of sodium hydroxide. The product obtained from this reaction is a liquid which is separated by a benzene extraction to give N-ethanol-xylene sulfonamide.

*Example 8*

The same procedure as was used in Example 6 is carried out with a mixture of 190.5 parts (one mol) of p-toluene sulfonyl chloride with 61 parts (one mol) of monoethanolamine in the presence of one mol of sodium hydroxide (in 20% aqueous solution). The reaction product is treated with formaldehyde to react with uncombined amine and then neutralized. After washing with water the product, p-toluene-ethanol sulfonamide, is separated off as an oily liquid containing some water (about 15%). This substance is compatible with urea formaldehyde resins as indicated in Example 1.

*Example 9*

To 121 parts of benzamide (preferably substantially free from ammonium benzoate), slurried into 121 parts of isopropyl alcohol, are added 162 parts of aqueous formaldehyde (37%) which has been previously neutralized with 3.4 parts of triethanolamine. On reacting at 40° to 50° C. for 30 to 60 minutes, the benzamide becomes soluble. The resulting product is separated and is compatible with urea and thiourea syrups as indicated in Example 3.

*Example 10*

To 147 parts of phthalimide slurried in 147 parts of isopropyl alcohol are added 81 parts of aqueous formaldehyde (37%) which has been previously neutralized with 1.7 parts of triethanolamine. On warming to 40° to 50° C., the flakes changed to a fine granular product, N-methanol phthalimide. An excess of neutralized aqueous formaldehyde was added and the mixture allowed to stand overnight at room temperature. The product is then separated and may be utilized in the manner illustrated in Example 4.

From the above examples it will be seen that there are at least two general methods which may be followed in preparing the new plasticizing compounds. According to one method, the acid chloride is reacted with an amine in the presence of an alkali according to the Schotten-Baumen reaction, whereas according to the other method, unless the temperature is held below certain limits and the pH kept within certain ranges, resinous reaction products will tend to form instead of the desired product. For example in the reaction of p-toluene sulfonamide with formaldehyde, the temperature should not exceed 40° C. as otherwise some of the nearly insoluble oily reaction products, probably the methylene derivatives, begin to form. Likewise the pH of the reaction mixture should be kept within the limits of approximately 5–8.

Although the invention is not to be considered as limited by any theoretical explanations, the various reactions described below may serve to give a better understanding of the present invention. They may also furnish a possible explanation of the high degree of compatibility of these new plasticizers and the excellent properties of the products containing them.

The structural formula for the resinous reaction product of $CH_3.C_6H_4.SO_2.NH_2$, for example, with HCHO. according to Hug. Bull. Soc. chim. 51, 990 (1934); Chem. Abs. 29, 752 (1935), is

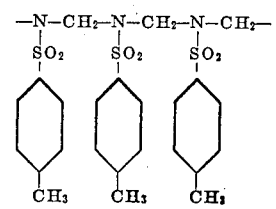

whereas the improved plasticizer formed by the reaction of these same two materials as in Example 5 has the structural formula $$CH_3.C_6H_4.SO_2NH.CH_2OH$$

This latter compound, a light colored, oily liquid, is compatible with urea resin syrup, for example in amounts up to 30% or higher.

It appears that the alkylol amido compounds of this invention do not condense to form the sulfonamide-aldehyde type resin as described by Hug, but instead combine with the thermosetting resin. For example, it is believed that the reaction between p-toluene methylol amides and urea-formaldehyde resins may be represented in the following manner:

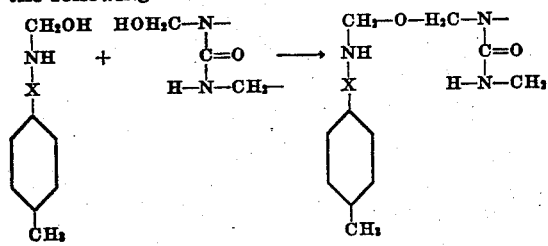

where X represents $SO_2$ or CO. The reaction would be similar with the hydroxyl group of a phenolic or other similar resin. There is a possibility that there might also be a reaction between the alkylol acid amide and the hydroxyl groups of the cellulosic filler, if such a filler be used.

These new plasticizing compounds have the advantage that they do not adversely affect the finish, strength, or water resistance of the resin in which they are incorporated. These compounds may be used either singly or mixed. They may be mixed with the molding powders or with the resin syrup. By the use of these plasticizers a decided improvement in the molding is obtained. The molding pressures necessary may be only one half the previously necessary value, enabling the molding of more complex shapes or larger pieces without any increase in the size of the press. Furthermore, because of the good compatibility no "sweating out" occurs. This has been one of the important difficulties with prior plasticizers. The improved molding property is particularly noticed with relatively large moldings having a long draw, such as cabinets, etc. These plasticizers are also of great value for use in the production of translucent laminated products for lighting and sign applications.

Any suitable changes may be made without departing from the spirit and scope of my invention as defined in the appended claims.

I claim:

1. A homogeneous composition comprising a urea formaldehyde resin and N-ethanol benzamide.

2. A homogeneous composition comprising a urea formaldehyde resin and N-ethanol stearamide.

3. A homogeneous composition comprising at least one thermosetting resin and an N-ethanol carboxylic acid amide.

4. A process for improving the plasticity of a molding composition including at least one thermosetting resin and an inert filler, comprising adding a small quantity of a compatible N-ethanol amide.

PAUL C. SCHROY.